(12) United States Patent  (10) Patent No.: US 9,190,824 B2
Knudsen  (45) Date of Patent: Nov. 17, 2015

(54) CORD REEL

(71) Applicant: Brandon Knudsen, Hyrum, UT (US)

(72) Inventor: Brandon Knudsen, Hyrum, UT (US)

( * ) Notice: Subject to any disclaimer, the term of this patent is extended or adjusted under 35 U.S.C. 154(b) by 159 days.

(21) Appl. No.: 14/045,267

(22) Filed: Oct. 3, 2013

(65) Prior Publication Data

US 2015/0097066 A1  Apr. 9, 2015

(51) Int. Cl.
*H02G 11/02* (2006.01)
*B65H 75/40* (2006.01)

(52) U.S. Cl.
CPC ............... *H02G 11/02* (2013.01); *B65H 75/40* (2013.01); *B65H 2701/34* (2013.01); *B65H 2701/536* (2013.01)

(58) Field of Classification Search
CPC .......... H02G 11/00; H02G 11/02; H02G 1/00
See application file for complete search history.

(56) References Cited

U.S. PATENT DOCUMENTS

| 2,585,070 | A | * | 2/1952 | Allard | 200/61.15 |
| 3,140,387 | A | * | 7/1964 | Green | 392/422 |
| 3,290,453 | A | * | 12/1966 | Jensen | 191/12.4 |
| 3,983,977 | A | * | 10/1976 | Crabb | 191/12.4 |
| 4,442,984 | A | * | 4/1984 | Bayat | 242/407 |
| 5,590,749 | A | * | 1/1997 | Wagner et al. | 191/12.4 |
| 5,700,150 | A | * | 12/1997 | Morin | 439/4 |
| 6,035,983 | A | * | 3/2000 | Benner | 191/12.2 R |
| 6,059,081 | A | * | 5/2000 | Patterson et al. | 191/12.2 R |
| 6,276,502 | B1 | * | 8/2001 | Leyba et al. | 191/12.2 R |
| 6,276,503 | B1 | * | 8/2001 | Laughlin, Jr. | 191/12.2 R |
| 6,327,507 | B1 | * | 12/2001 | Buchan | 607/115 |
| 6,349,808 | B1 | * | 2/2002 | Bryant | 191/12.2 R |
| 6,374,970 | B1 | * | 4/2002 | Liao | 191/12.4 |
| 2005/0039997 | A1 | * | 2/2005 | Mackin et al. | 191/12.2 R |
| 2009/0156053 | A1 | * | 6/2009 | Hwang et al. | 439/501 |
| 2010/0059268 | A1 | * | 3/2010 | St.Clair | 174/481 |
| 2012/0061503 | A1 | * | 3/2012 | Harty | 242/379 |
| 2014/0238805 | A1 | * | 8/2014 | Harty | 191/12.2 R |
| 2015/0097066 | A1 | * | 4/2015 | Knudsen | 242/400 |

* cited by examiner

*Primary Examiner* — Jason C Smith

(74) *Attorney, Agent, or Firm* — Loza & Loza, LLP; Tyler Barrett

(57) ABSTRACT

Cord reels are disclosed, which are adapted to keep electrical cords organized within a reasonable area. According to one example, a cord reel can include a fixed housing with electrical prongs protruding from one end, and a rotational housing coupled to the fixed housing. The rotational housing may be adapted to hold an electrical cord. At least one electrical receptacle adapted to receive an appliance plug, such as a standard plug or a residual current device (RCD) plug, may be mounted to the rotational housing such that the appliance plug and an immediately adjacent appliance cord will rotate at least substantially within a limited cylindrical plane. Other aspects, embodiments, and features are also included.

19 Claims, 15 Drawing Sheets

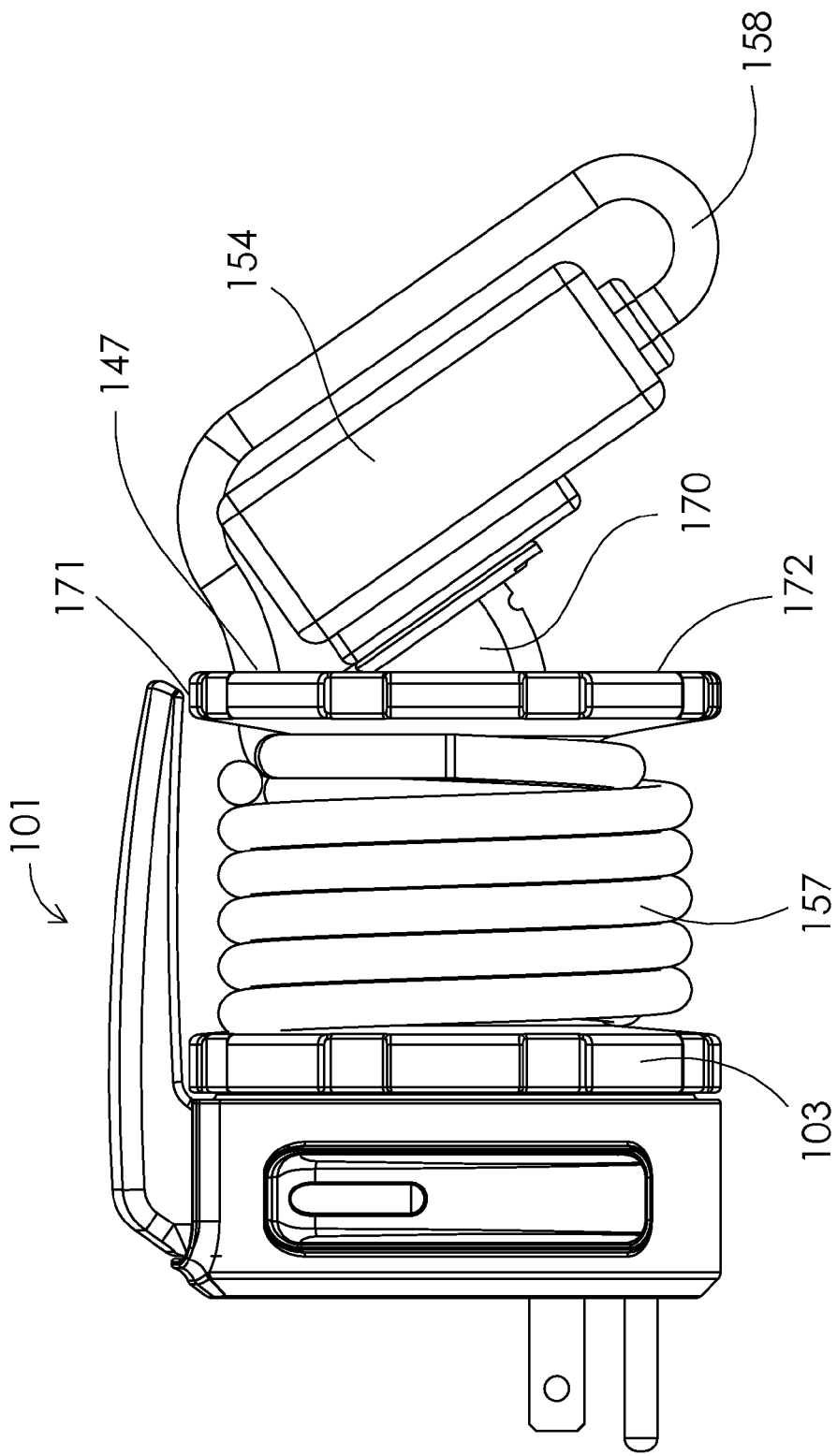

CORD REEL

TECHNICAL FIELD

The following relates generally to reels for spooling linear material, and more specifically to reels for spooling electrical cords for electrical devices.

BACKGROUND

In many environments, multiple electrical devices may be used in a relatively small area. For example, multiple electrical devices may be employed in a conventional residential bathroom, such as a hair dryer, a curling iron, a straightener, an electrical razor, etc. Typically many or even all of such electrical components may obtain electrical power by means of an electrical cord that is configured to be coupled with a conventional electrical outlet.

In instances where several electrical devices are utilized in a small area, the electrical cords of two or more electrical devices may become tangled. As a result, the electrical devices can become difficult to use or may require substantial time to untangle. In other instances, an electrical device (e.g., television, toaster, etc.) may be positioned near an electrical outlet so that the device's cord is substantially longer than the distance to the electrical outlet. In such instances, the excess cord may be found filling the floor or counter space in an unsightly manner. Accordingly, it is desirable to provide cord reels that are capable of keeping such electrical cords organized.

Other aspects, features, and embodiments associated with the present disclosure will become apparent to those of ordinary skill in the art upon reviewing the following description in conjunction with the accompanying figures.

SUMMARY

Various aspects of the present disclosure relate to cord reels that are capable of keeping electrical cords organized. According to at least one aspect of the disclosure, cord reels may include a fixed housing with electrical prongs protruding from one end thereof. A rotational housing may be connected to the fixed housing and adapted to hold an electrical cord. One or more electrical receptacles may be mounted to the rotational housing, such that an appliance plug coupled to the electrical receptacle and an immediately adjacent appliance cord rotates within a cylindrical plane at least substantially equal to an outer diameter of the rotational housing. In some examples, the one or more electrical receptacles may include an electrical receptacle pivotably mounted to the rotational housing, slidably mounted to the rotational housing, and/or fixed within the rotational housing. In some examples, the rotational housing may include a minor diameter portion with a recess adapted to hold an appliance plug body at least substantially therein, and an electrical receptacle may be disposed within the recess.

Further aspects of the disclosure include cord reels with a fixed housing including electrical prongs protruding from one end thereof. A rotational housing may be connected to the fixed housing and adapted to hold an electrical cord. Further, one or more electrical receptacles may be mounted to the rotational housing such that an appliance plug coupled to the electrical receptacle and an immediately adjacent appliance cord can rotate at least substantially within a cylindrical plane with a diameter of about 3.5 inches or less. In some examples, the one or more electrical receptacles may include an electrical receptacle pivotably mounted to the rotational housing, slidably mounted to the rotational housing, fixedly mounted to the rotational housing, and/or positioned within a recess in a smaller diameter portion of the rotational housing.

Additional aspects of the present disclosure include methods of making cord reels. According to one or more implementations, such methods may include forming a fixed housing with electrical prongs protruding from one end thereof. A rotational housing may be coupled to the fixed housing, where the rotational housing is adapted to hold an electrical cord. An electrical receptacle may be coupled to the rotational housing, such that when either a standard plug or residual current device (RCD) plug is coupled to the electrical receptacle the standard plug or RCD plug, together with an immediately adjacent appliance cord, can rotate at least substantially within a cylindrical plane comprising a diameter of about 3.5 inches or less.

BRIEF DESCRIPTION OF THE DRAWINGS

FIG. 9A is a side view of the cord reel shown in FIG. 1 with the reel outlet tilted to a second position and an RCD appliance plug and cord on the reel.

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and/or components are shown in block diagram form in order to avoid obscuring the described concepts and features.

The illustrations presented herein are, in some instances, not actual views of any particular plug feature or cord reel, but are merely idealized representations which are employed to describe the present disclosure. Additionally, elements common between figures may retain the same numerical designation.

Figure 1:
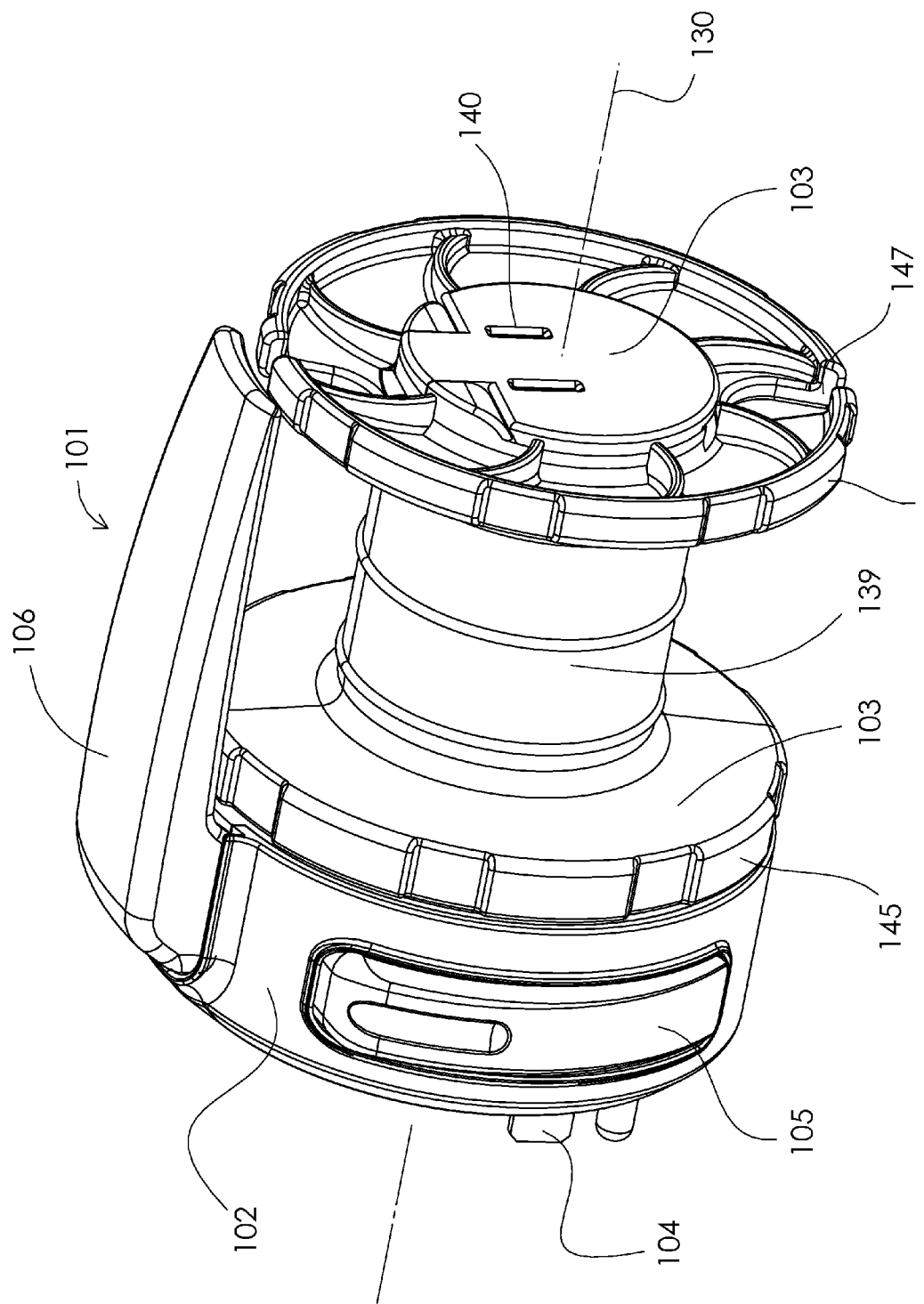
FIG. 1 is an isometric view illustrating a cord reel according to at least one example.

Various examples of the present disclosure include cord reels adapted to facilitate organization of electrical cords for one or more electrical devices. FIG. 1 is an isometric view illustrating a cord reel 101 according to at least one example. In general, the cord reel 101 includes a fixed housing 102 connected to a rotational housing 103. Additionally, the rotational housing 103 is adapted to receive prongs from a conventional appliance plug (not shown). The various components of the cord reel 101 will now be discussed in greater detail.

In general, the fixed housing 102 may include electrical prongs 104 protruding from one end. A push button 105 may be disposed within the fixed housing 102 to control rotation of the rotational housing 103. Also a cord guide 106 may be included. The fixed housing 102 is adapted to be coupled with the rotational housing 103 mounted to one end.

Figures 2A, 2B:
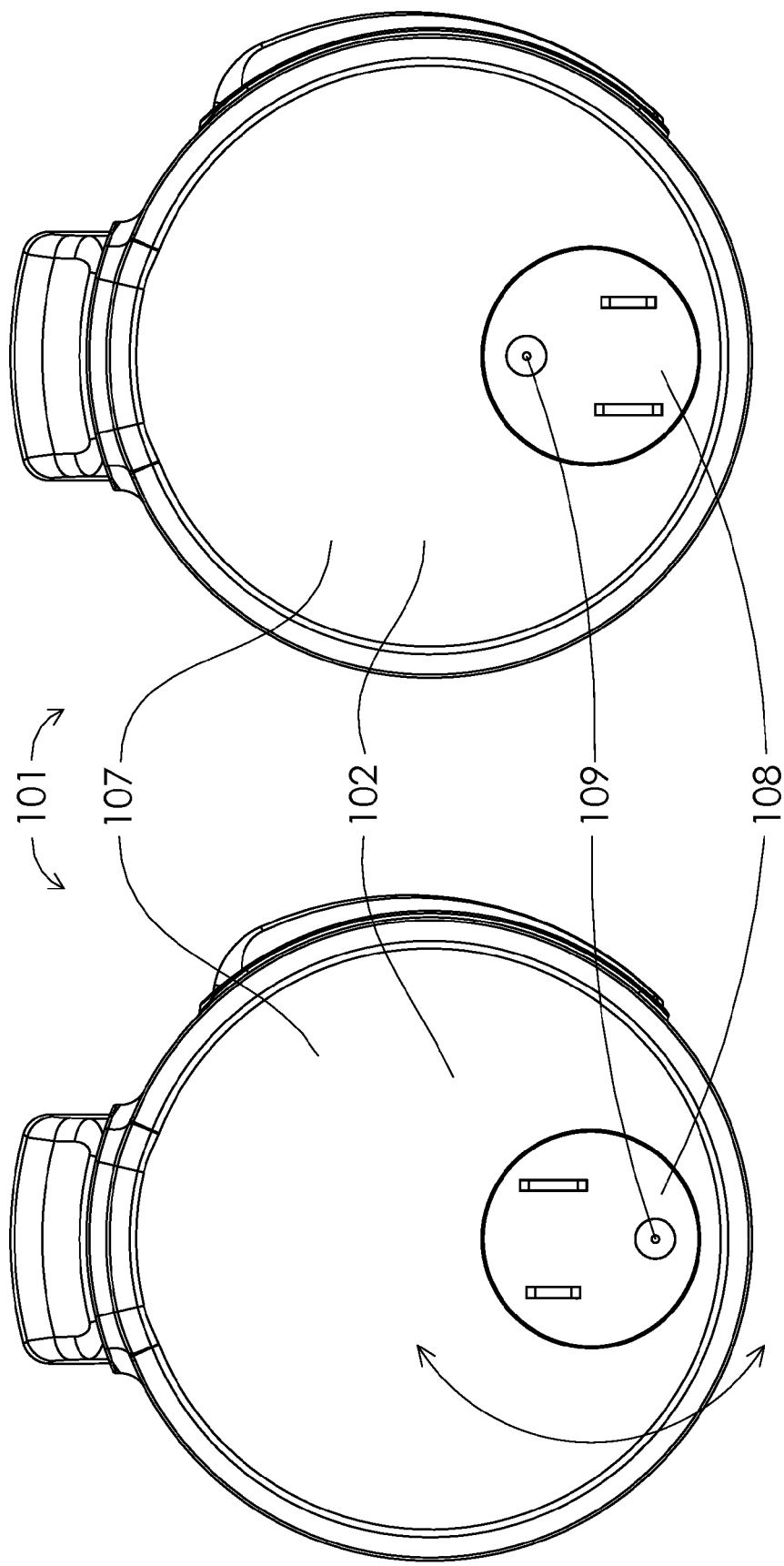
FIG. 2A is a front view of the cord reel shown in FIG. 1 with the electrical prongs rotated to a first position.
FIG. 2B is a front view of the cord reel shown in FIG. 2A with the electrical prongs rotated to a second position.

Referring to FIGS. 2A and 2B, a front view of a cord reel 101 is shown according to at least one embodiment. According to at least one aspect of the present disclosure, the electrical prongs 104 protruding from the end 107 of the fixed housing 102 can be adapted to rotate as a separate assembly in relation to the fixed housing 102. In this embodiment, the prong assembly 108 may rotate between two or more positions, 180 degrees apart, as depicted in FIGS. 2A and 2B. FIG. 2A shows the ground plug 109 down and FIG. 2B shows the ground plug 109 up. Although these figures show a standard 120VAC US prong assembly, a person of ordinary skill in the art will understand that the particular plug configuration may vary according to geographic location and/or plug types.

Many different methods may be employed to lock the prong assembly 108 into one or more positions. By way of example, the cord reel 101 shown in FIG. 3A employs raised dimples 110, positioned 180 degrees apart on the fixed housing 102, with matching detents 111 in the prong assembly 108. A rotational torque is required to move the prong assembly 108 from one aligned position to another with a slight interference between the raised dimples 110 and the detents 111 in the prong assembly 108 during misalignment. This rotational torque is used to hold the prong assembly 108 in the aligned position desired. Other embodiments may employ such methods as a separate spring loaded slide lock, spring detents or other methods known by those with ordinary skill in the art.

Figure 5:
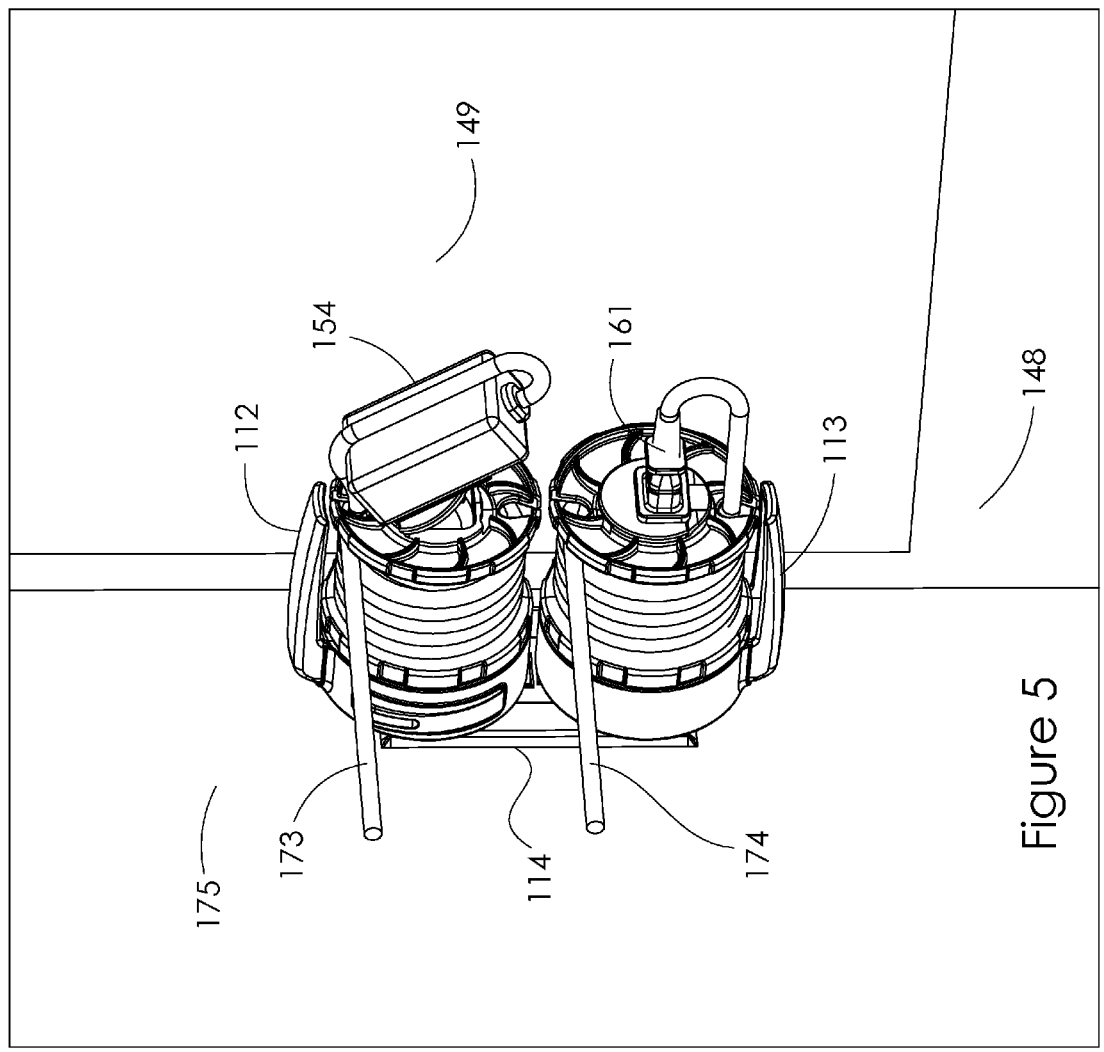
FIG. 5 is an isometric view of the cord reel shown in FIG. 1 installed in a standard wall electrical outlet, with an additional cord reel installed above.

Referring to FIG. 5, an isometric view of two cord reels 112 and 113 is illustrated according to one embodiment. In this figure, the upper cord reel 112 has the prong assembly 108 positioned as in FIG. 2a, and the lower cord reel 113 has the prong assembly 108 positioned as in FIG. 2b. This allows more than one cord reel assembly to plug into a single standard outlet 114 without interfering with one another. This can enable multiple electrical appliances to be used at the same time, in the same outlet, while also enabling excess appliance cord to be kept up, out of the way of the user.

Figure 3A:
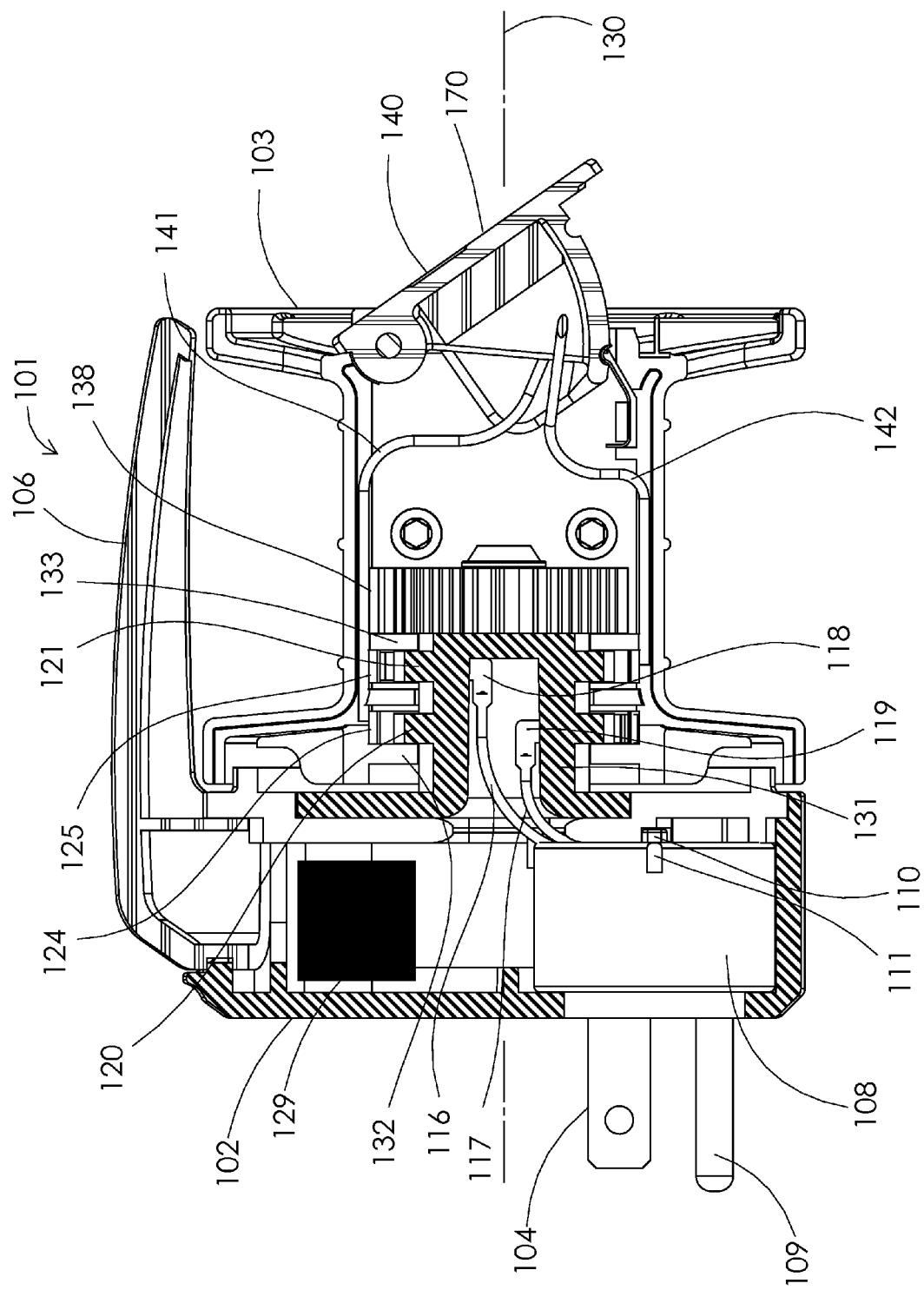
FIG. 3A is a cross sectional side view of the cord reel shown in FIG. 1.

Referring to FIG. 3A, a cross sectional side view of a cord reel 101 is shown according to one embodiment. The electrical prongs 104 transfer electrical power into the fixed housing 102. The opposite ends of the electrical prongs 115 (see FIG. 4) are disposed within the fixed housing 102. Electrical power is then transferred from the electrical prongs 115 to the electrical wires 116 and 117. Then electrical power is transferred from the electrical wires 116 and 117 inside the fixed housing 102 to wire terminals 118 and 119 which are mounted to the raised annular ribs 120 and 121. A portion of the wire terminals 118 and 119 are disposed within the fixed housing 102. The opposite end of the wire terminals 122 and 123 (see FIG. 4) protrude from the fixed housing 102 transferring electrical power from the fixed housing 102 to the rotational housing 103 by wiping the wire terminals 118 and 119 against the power traces 124 and 125 extending along the inner diameter of the rotational housing 103.

Figure 3B:
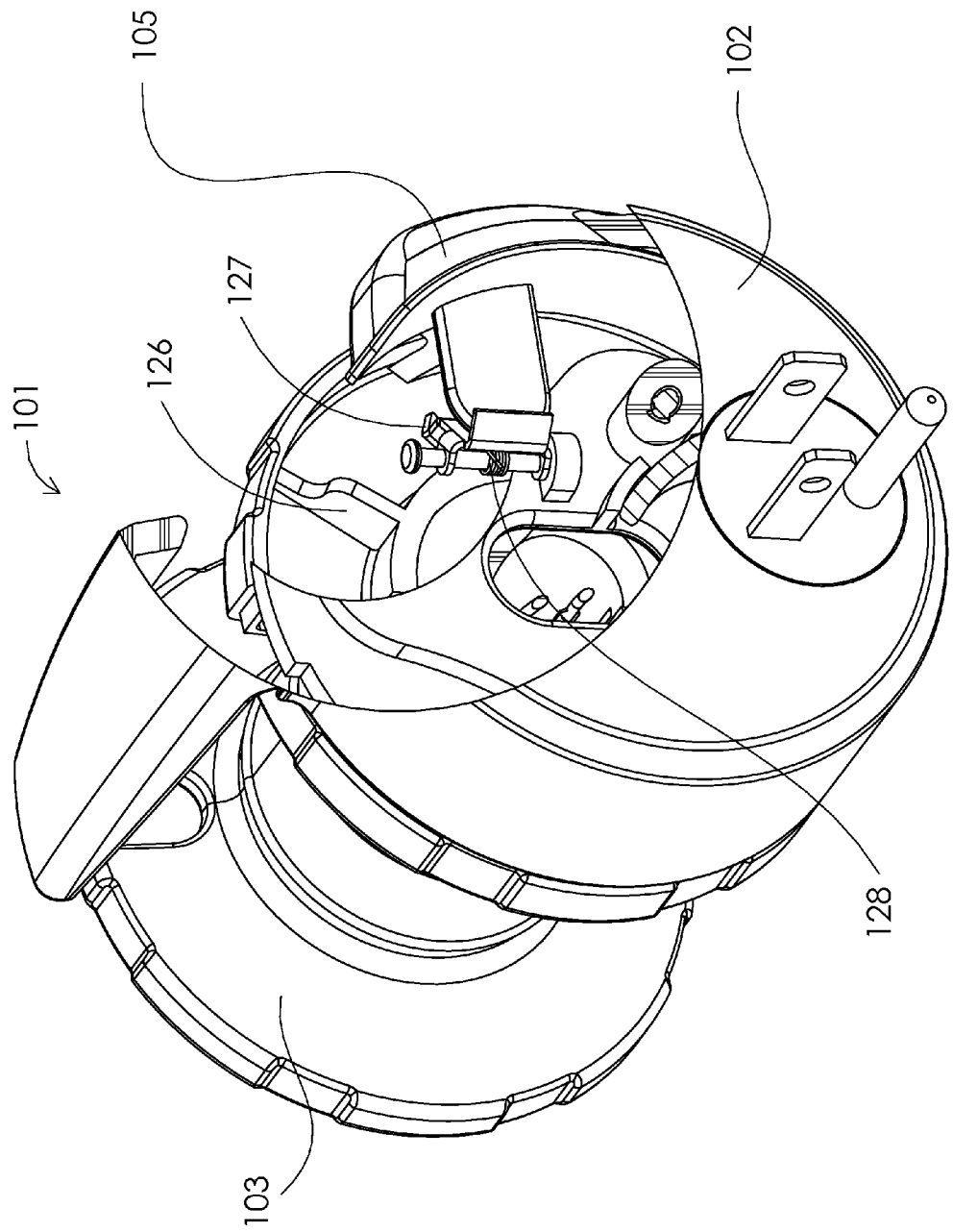
FIG. 3B is an isometric cross sectional view of a push button and related components of the cord reel shown in FIG. 3A.

Referring to FIG. 3B, an isometric cross sectional view of the cord reel 101 shown in FIG. 3A is depicted. As noted above, a push button 105 may be disposed within the fixed housing 102. The push button 105 in this embodiment serves to actuate movement of the rotational housing 103. This can be done in many ways as are known by those skilled in the art. By way of example and not limitation, the push button 105 shown in FIG. 3B actuates a ratchet and pall style mechanical lock. The ratchet, in the form of raised ribs 126 on the rotational housing 103 in this example, catches against the pall, a formed metal bracket 127 that is spring loaded via a torsion spring 128 against the ratchet ribs 126. The push button 105 moves the formed bracket 127 away from the raised rib 126 allowing the rotational housing 103 to rotate until the push button 105 is released, reengaging the formed bracket 127. This winding and unwinding process can be stopped at any cord length by releasing the push button 105. In another embodiment, the push button 105 could be used to actuate an electric motor (not pictured). The electric motor would be connected between the fixed housing 102 and the rotational housing 103. Actuating the push button 105 would then energize the electric motor causing the rotational housing 103 to rotate.

Referring to FIG. 1, a cord guide 106 may be attached to the fixed housing 102 and extend from the fixed housing 102 over at least a portion of the rotational housing 103. In this embodiment, the cord guide 106 would serve to direct an appliance cord (not pictured) onto the rotational housing 103. The cord guide 106 may also keep the appliance cord from coming off of the rotational housing 103. In this embodiment, the cord guide 106 is fixed to the fixed housing 102. In another embodiment, the cord guide 106 could be hinged at the attachment point to the fixed housing 102. This would allow the cord guide 106 to pivot radially either onto or away from the rotational housing 103. The cord guide 106 could further be spring loaded to provide force directed against the appliance cord. This could serve to wrap the appliance cord tighter against the rotational housing 103.

Referring to FIG. 3A, the fixed housing 102 can also include such elements as an electrical circuit 129 for a timer, a surge protection circuit, and/or an on/off switch. According to one embodiment, these features could provide an enhanced level of user safety and convenience. These circuits may be configured in many different ways as are known by those skilled in the art.

Referring still to FIG. 3A, the fixed housing 102 can be adapted to mount the rotational housing 103 to facilitate rotation around an axis 130 extending through the center of the fixed housing 102. In one embodiment this is accomplished via raised annular ribs 120, 121 protruding from a smaller diameter portion 131 of the fixed housing 102 that mate to adjacent annular ribs 132, 133 in the rotational housing 103. This interface between the raised annular ribs 120, 121 on the fixed housing 102 can also serve as a bearing surface for the rotational housing 103. This would allow the rotational housing 103 to rotate freely around an axis 130 of the fixed housing 102 without binding.

Figure 4:
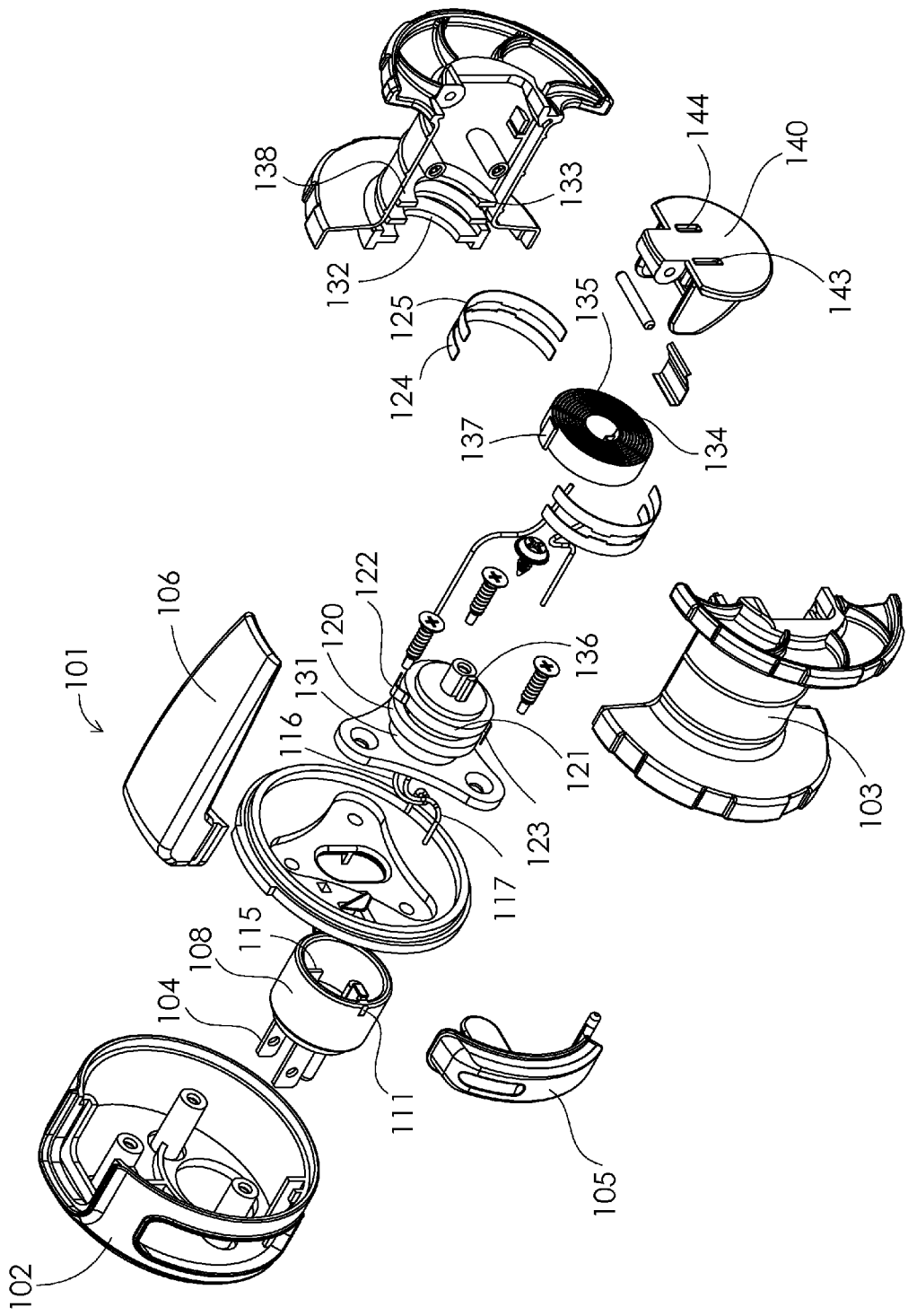
FIG. 4 is an isometric exploded view of the cord reel shown in FIG. 1.

Referring to FIG. 4, an exploded view of a cord reel 101 is shown according to at least one embodiment. As shown, the smaller diameter portion 131 on the fixed housing 102 can also be adapted to allow mounting for a component which enables a force to be applied to rotate the rotational housing 103, causing an appliance cord to wind or unwind from the rotational housing 103. In one embodiment, this can be accomplished by attaching the inner free end 134 of a clock style spring 135 to a post 136 on the fixed housing 102. The outer free end 137 of the clock spring 135 is then fixed to a rib 138 on the inside of the rotational housing 103. This allows a torque to be generated as the rotational housing 103 is wound such that the clock spring 135 is tightened. In another embodiment, an electrical motor can be fixed between the fixed housing 102 and the rotational housing 103. The electrical motor could then be wound in either direction to wind or unwind an attached appliance cord. In other embodiments this could be accomplished in different ways as are known by those skilled in the art.

In general, the rotational housing 103 shown in FIG. 1 may include a space 139 adapted to hold an appliance cord. Additionally, an electrical outlet 140 may be disposed within the rotational housing 103. The rotational housing 103 may also be adapted to transfer electrical power between the fixed housing 102 and the electrical outlet 140.

Referring to FIG. 3A and FIG. 4. As previously discussed, electrical power is transferred to the power traces 124 and 125 extending along the inner diameter of the rotational housing 103. Connected to the power traces 124 and 125 are electrical wires 141 and 142 which according to one embodiment may run on opposite sides of the rotational housing 103. These electrical wires extend from the power traces 124 and 125, inside the rotational housing, to the terminals 143 and 144 on the electrical outlet 140. This allows power to be transferred to an appliance plug inserted into the electrical outlet 140 disposed within the rotational housing 103.

Referring to FIG. 1, the rotational housing 103 may be formed such that there is a minor diameter 139 adapted to hold a length of electrical cord. According to one embodiment, the opposing ends 145 and 146 of the rotational housing 103 may be formed with a diameter that is larger than that of the rest of the rotational housing 103. This would create a space such that a length of electrical cord from an appliance would be able to at least partially wrap around the circumference of the smaller or minor diameter portion 139 of the rotational housing 103. In this embodiment, the appliance cord could be between 1 and 12 feet in length, with a length of 2 to 8 feet being more common. This smaller or minor diameter portion 139 serves to both protect the wrapped portion of the electrical cord and prevent the cord from slipping off of the end 146 of the rotational housing 103 during use of the cord reel 101. Additionally, according to one embodiment, the larger diameter free end 146 of the rotational housing 103 may be configured with at least one electrical cord strain relief 147. This strain relief 147 may serve as a guide for starting an electrical cord onto the rotational housing 103. The strain relief 147 also allows a place where the electrical cord may be secured to the rotational housing 103 such that enough of the cord is left between the strain relief 147 and the end of the electrical cord plug to prevent kinking and potential damage to the cord at the connection to the plug.

According to at least one embodiment, this larger outer diameter portion 145 and 146 of the rotational housing 103 could be sized between about 1.5 in to 4.0 in, with a diameter of 2.5 in to 3.5 in being more common for some embodiments. Referring to FIG. 5, the outer diameter size can be selected to enable the cord reels 112 and 113 to fit in places where the space immediately surrounding a wall electrical outlet 114 is restricted by common building materials such as adjacent walls 148, mirrors 149, cupboards, wall fixtures and the like. According to one embodiment, the cord reels 112 and 113 can fit within the width of a standard electrical outlet 114 and accompanying cover plate. This can enable the cord reels 112 and 113 to be used in any space that a standard electrical outlet 114 is installed. Furthermore, this can enable multiple reels to fit within the space available in a multi-ganged electrical outlet.

According to at least one aspect of the present disclosure the rotational housing 103 may have at least one electrical receptacle disposed within the free end. The electrical receptacle can be adapted to receive prongs from a conventional appliance plug. Depending on the appliance plug body used in the cord reel, the appliance plug body can be positioned in the electrical receptacle to enable the appliance plug body to remain substantially within a cylindrical plane at least substantially equal to an outer diameter of the rotational housing.

Figure 6:
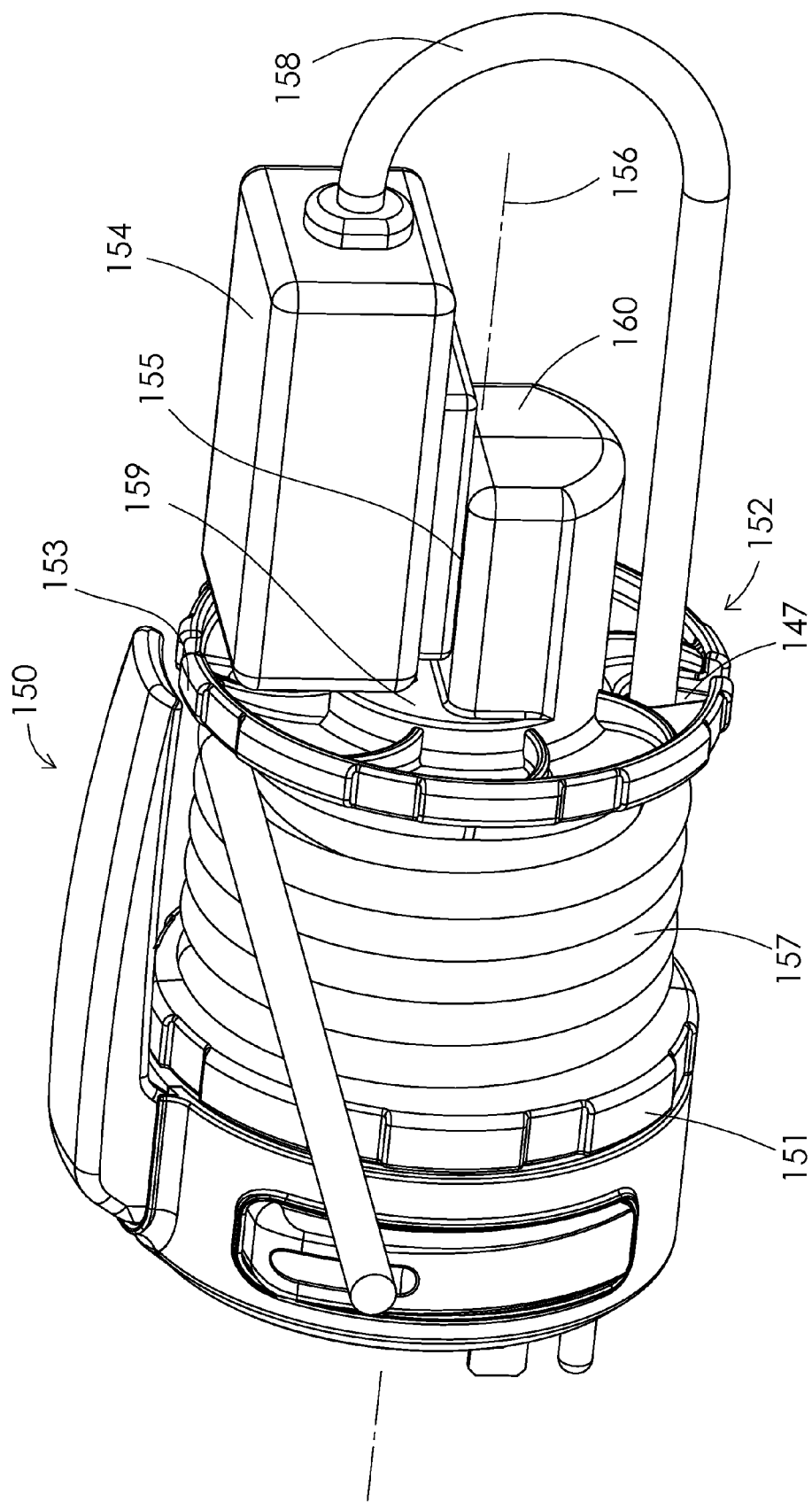
FIG. 6 is an isometric view of an alternative embodiment of a cord reel, with a residual current device (RCD) appliance plug installed.

FIG. 6 illustrates one example of an electrical receptacle 155 according to one embodiment. As shown, a residual current device (RCD) appliance plug 154 is installed in the electrical receptacle 155 with the appliance plug 154 parallel to the axis of rotation 156 for the rotational housing 151. The appliance cord 157 is then looped back at 158 toward the cord reel 150, inserted through the cord strain relief 147 and wrapped at least partially around the rotational housing 151. This can enable the relatively larger plug body 154 to rotate away from a position parallel to the rear face 159 of the rotational housing 151. If the RCD plug body 154 were installed either in the rear face 159 or the end 160, the appliance cord 157 may be unable to be wound or unwound from the rotational housing 151 when the cord reel 150 is installed in an electrical outlet. This is due to a significant percentage of the plug body 154 extending outside of a cylindrical plane at least substantially equal to an outer diameter 153 of the rotational housing 151. In contrast, the appliance cord 157 in FIG. 6 may be wound and unwound from the cord reel 150 when installed in any electrical outlet that will fit the cord reel 150.

Figure 7:
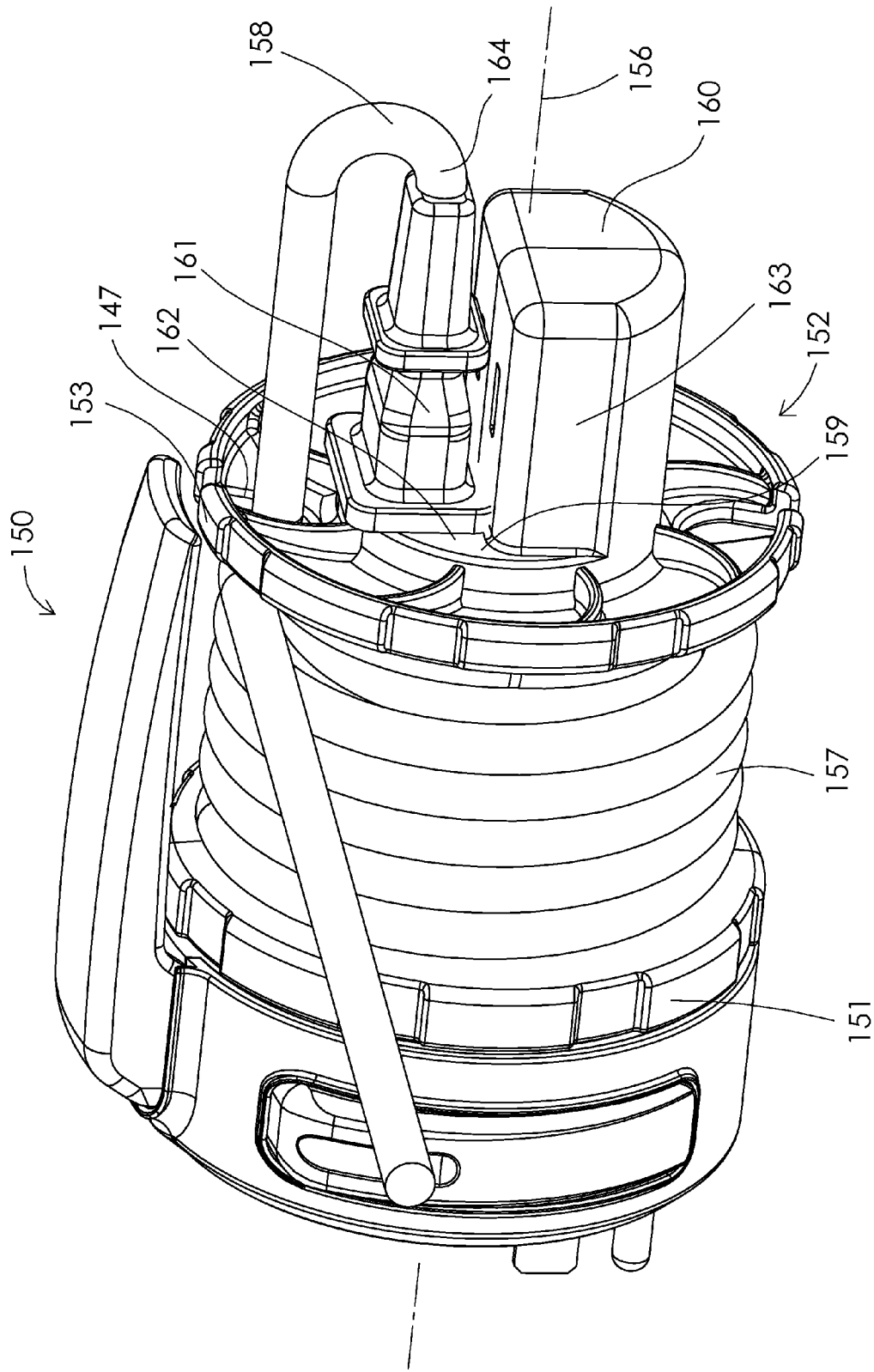
FIG. 7 is an isometric view of the cord reel shown in FIG. 6, with a standard appliance plug installed.

Referring to FIG. 7, an isometric side view of the cord reel 150 is shown according to at least one embodiment. In this example, the cord reel 150 includes two electrical receptacles, 162, 163. The electrical receptacle is again disposed within the free end 152 of the rotational housing 151. However, in this embodiment, a standard appliance plug 161 is installed in the electrical receptacle 162 disposed within the right face 159 of the rotational housing 151. According to another embodiment, the electrical receptacle 162 could be disposed within the exposed face 160 of the protruding electrical outlet body 163. In either embodiment, the appliance cord 157 is then looped back at 158 toward the cord reel 150, inserted through the cord strain relief 147 and wrapped at least partially around the rotational housing 151. This can enable the standard plug body 161 to extend parallel to the axis of rotation 156 for the rotational housing 151. If the standard plug body 156 were left at an angle perpendicular to the rear face 159, the appliance cord may be unable to be wound or unwound from the rotational housing 151 when the cord reel 150 is installed in an electrical outlet. This is due to a significant percentage of the plug body 161 and immediately adjacent appliance cord 164 that may extend outside of a cylindrical plane at least substantially equal to an outer diameter 153 of the rotational housing 151. In contrast, the appliance cord 157 shown in FIG. 7 may be wound and unwound from the cord reel 150 when installed in any electrical outlet that will fit the cord reel assembly 150.

Figure 8:
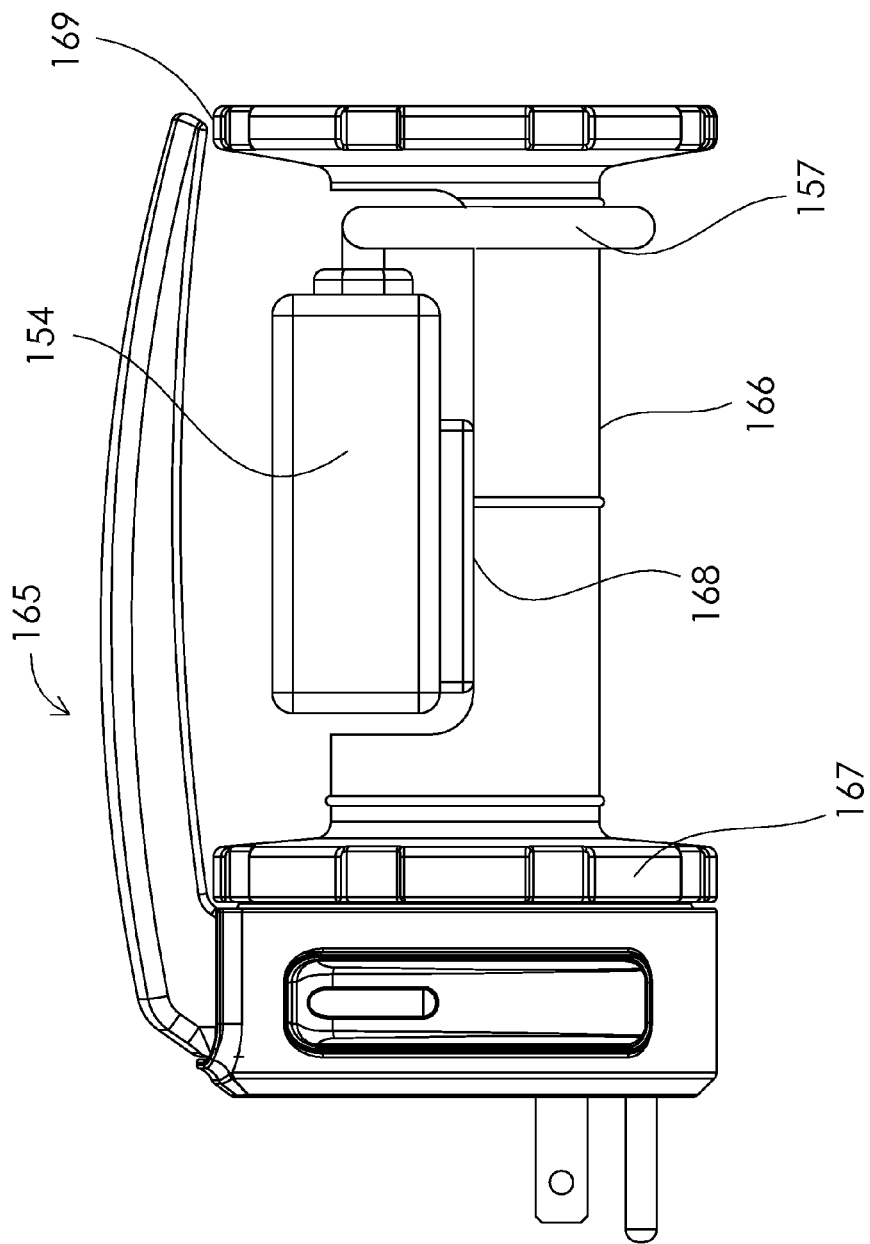
FIG. 8 is a side view of an alternative embodiment of a cord reel with an RCD appliance plug installed in the recessed portion of the cord reel.

Referring to FIG. 8, a side view of a cord reel 165 is shown according to one embodiment. In this example, the smaller or minor diameter portion 166 on the rotational housing 167 includes a recess 168 including at least one electrical receptacle. As shown, the RCD plug body 154 can be installed in the recessed outlet and the appliance cord 157 wound/unwound over the top of the plug body 154, such that the plug body 154 and appliance cord 157 can remain substantially within a cylindrical plane at least substantially equal to an outer diameter 169 of the rotational housing 167. According to this embodiment, the appliance cord 157 can be wound and unwound from the cord reel 165 when installed in any electrical outlet that will fit the cord reel assembly 165.

Referring to FIG. 3A, further embodiments may employ an electrical receptacle 170 pivotably mounted to the rotational housing 103. This electrical receptacle 170 may be adapted to facilitate use of multiple appliance plug body styles, transferring power from the rotational housing 103 to the electrical outlet assembly 170.

Figure 9B:
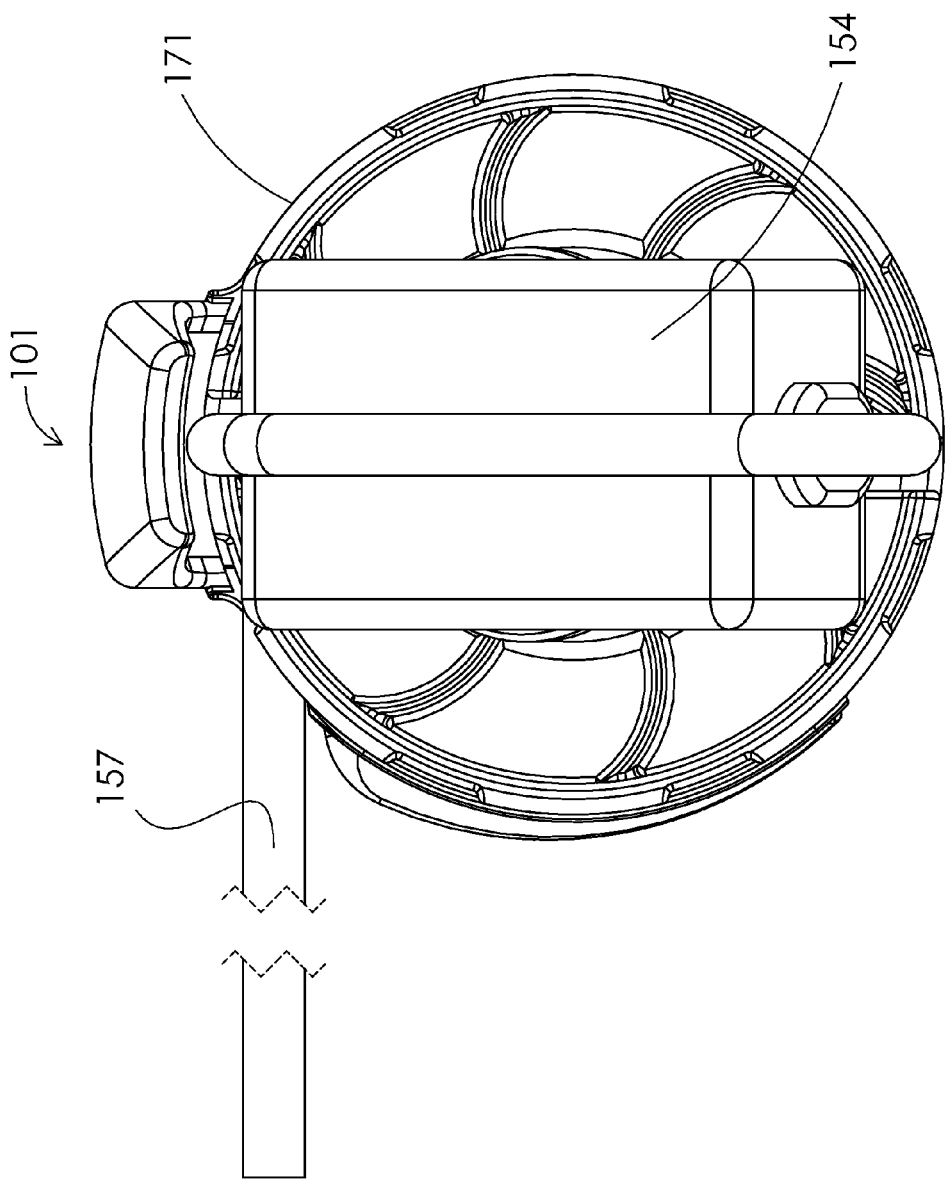
FIG. 9B is a rear view of the cord reel shown in FIG. 9A.

Referring to FIG. 9A, a side view of a cord reel 101 is depicted according to at least one embodiment with a pivoting electrical receptacle 170. The electrical receptacle 170 is disposed within the end of the rotational housing 103. The electrical receptacle 170 may pivot such that it may be moved between at least two positions. Depending on the appliance plug body used in the cord reel 101, the position of the electrical outlet assembly 170 can be positioned to allow the appliance plug body to remain substantially within a cylindrical plane at least substantially equal to an outer diameter of the rotational housing 171. According to this embodiment, an RCD appliance plug 154 is shown installed in the electrical receptacle 170, with the receptacle 170 pulled outward. The appliance cord 157 is then looped back at 158 toward the cord reel 101, inserted through the cord strain relief 147 and wrapped at least partially around the rotational housing 103. This can allow the much larger plug body 154 to rotate away from a position parallel to a face 172 of the rotational housing 103. If the RCD plug body 154 were left parallel to the face 172, the appliance cord 157 may be unable to be wound or unwound from the rotational housing 103 when the cord reel 101 is installed in an electrical outlet. This is due to a significant percentage of the plug body 154 that may extend outside of a cylindrical plane at least substantially equal to an outer diameter 171 of the rotational housing 103. In contrast, as shown in FIG. 9B, a rear view of the cord reel 101 shown in FIG. 9A, the appliance cord 157 may be wound and unwound from the cord reel 101 when installed in any electrical outlet that will fit the cord reel assembly 101, while the plug body 154 is maintained at least substantially within a cylindrical plane at least substantially equal to the outer diameter of the rotational housing 171.

Figure 10:
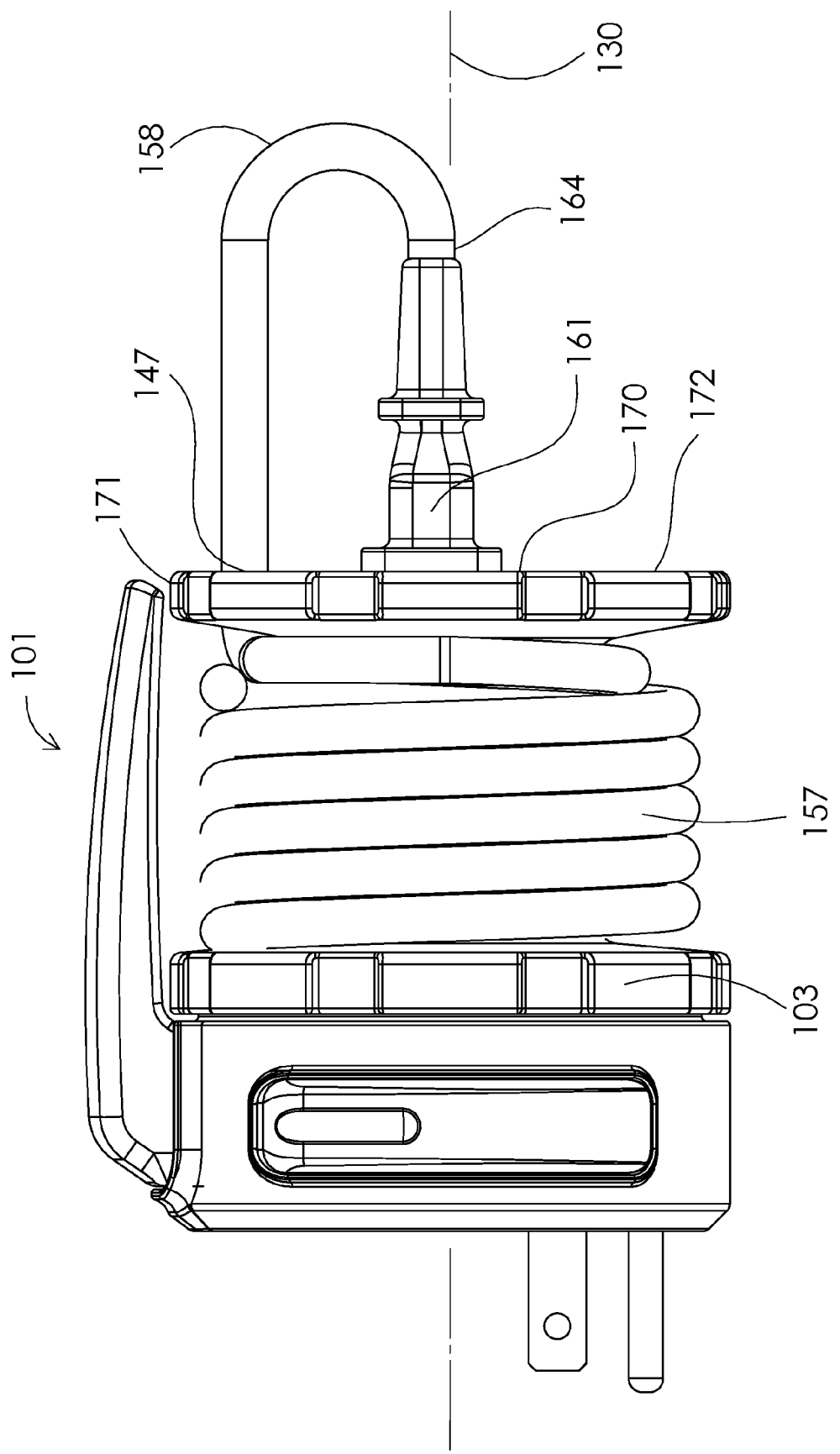
FIG. 10 is a side view of the cord reel shown in FIG. 9A with the reel outlet tilted to a first position with a standard appliance plug and cord on the reel.

Referring to FIG. 10, a side view of a cord reel 101 shown according to at least one embodiment with a pivoting electrical receptacle 170 as discussed in FIGS. 9A and 9B. In this Figure, the pivoting electrical receptacle 170 is shown positioned with the face of the receptacle parallel to the face 172 of the rotational housing 103. A standard appliance plug 161 is installed in the electrical receptacle 170. The appliance cord is then looped back at 158 toward the cord reel 101, inserted through the cord strain relief 147 and wrapped at least partially around the rotational housing 103. This can enable the standard plug body 161 to extend parallel to the axis of rotation 130 for the rotational housing 103. If the standard plug body 161 were left at an angle to the face 172, the appliance cord 157 may be unable to be wound or unwound from the rotational housing 103 when the cord reel 101 is installed in an electrical outlet. This is due to a significant percentage of the plug body 161 and immediately adjacent appliance cord 164 that may extend outside of a cylindrical plane at least substantially equal to an outer diameter 171 of the rotational housing 103. In contrast, the appliance cord 157 shown in FIG. 10 may be wound and unwound from the cord reel 101 when installed in any electrical outlet that will fit the cord reel assembly 101.

Referring back to FIG. 5, a perspective view of two cord reels 112 and 113 that are plugged into a wall outlet 114. These cord reels 112 and 113 are depicted with pivoting electrical receptacles as described with reference to FIGS. 1, 9A, 9B, and 10. The upper cord reel 112 is shown with an RCD appliance plug body 154 and an appliance cord 173, while the lower cord reel 113 is shown with a standard appliance cord plug 161 and an appliance cord 174. The lower cord reel 113 has the rotating electrical prong assembly 108 turned to a second position as previously described in FIGS. 2a and 2b, such that it may be plugged into a wall outlet 114 with the upper cord reel 112. The size of the cord reels 112 and 113 and positioning of the plug bodies 154 and 161 enables both appliance cords 173 and 174 to be wound and unwound without interfering with each other and without removing either of the cord reels 112 or 113 from the wall outlet 114. This shows a practical application of the cord reels in use. Typically, multiple appliances are plugged into the same outlet, due to limited availability of outlets. It is possible that due to the size of other cord reels, only one reel may fit in the standard electrical outlet 114. Additionally, immediately to the right of the wall outlet 114 is shown a wall 148 that is perpendicular to the wall 175 on which the cord reels 112 and 113 are plugged in. This situation is not uncommon, particularly in homes. It is possible that due to the size of other cord reels, even one reel would not fit in this location with the immediately adjacent wall 148. This is an additional versatility of the cord reels of the present disclosure, such as cord reels 112 and 113. Again, the size of the cord reels 112 and 113 and positioning of the plug bodies 154 and 161 enables the appliance cord length 173 and 174 to be adjusted without interfering with each other and without removing the cord reels 112 and 113 from the wall outlet 114.

Figure 11:
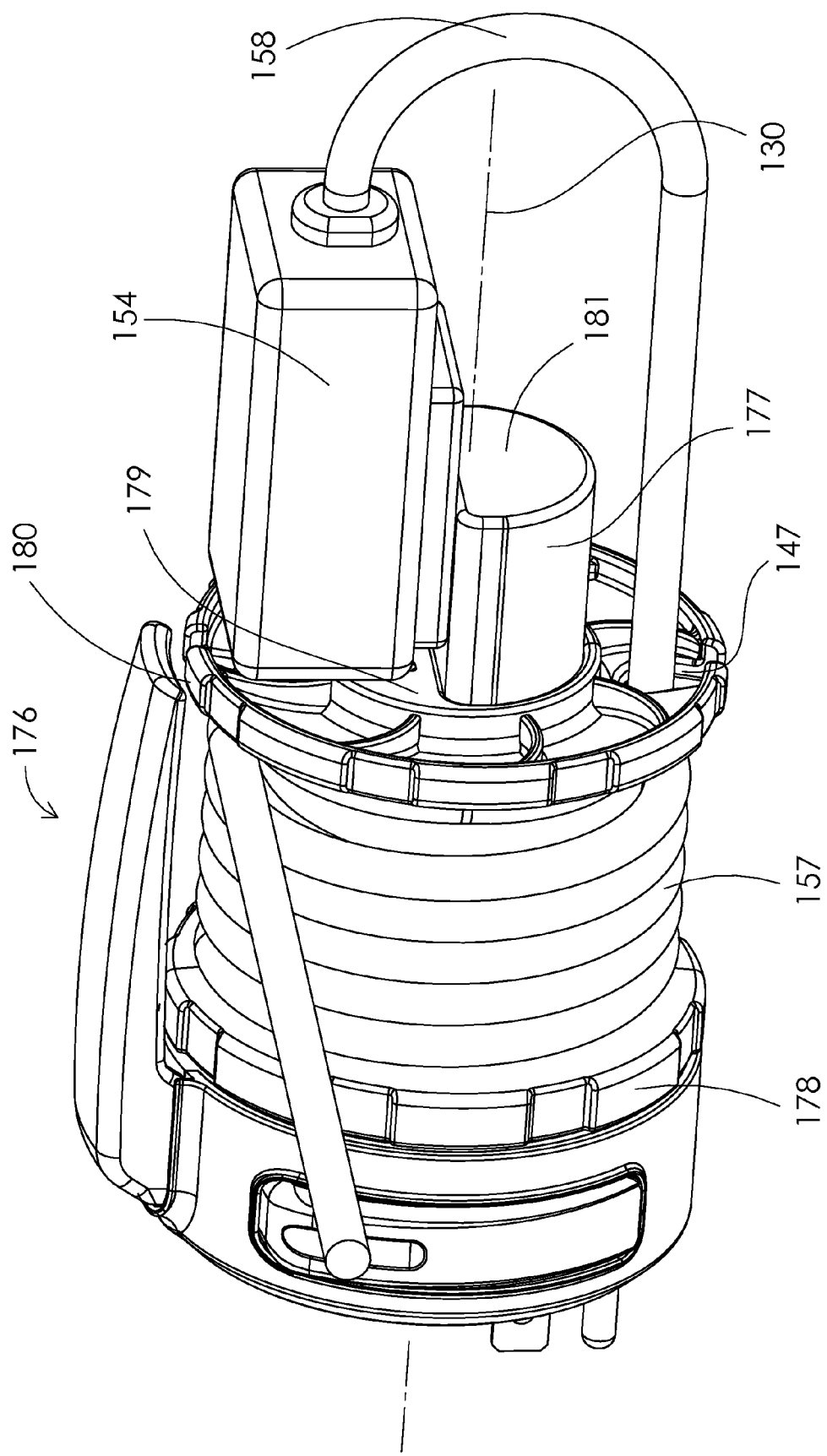
FIG. 11 is an isometric view of an alternative embodiment of a cord reel with the reel outlet extended to a second position and an RCD appliance plug and cord on the reel.

Referring to FIG. 11, an isometric side view of a cord reel 176 is shown according to at least one embodiment with a sliding electrical receptacle 177. The electrical receptacle 177 is disposed within the end of the rotational housing 178 and has at least one electrical outlet. Additionally, a standard electrical outlet may be disposed within the face 179 of the rotational housing 178. The electrical receptacle 177 may slide parallel to the axis of rotation 130 such that it may be moved between at least two positions. Depending on the appliance plug body used in the cord reel 176, the position of the electrical receptacle 177 can be changed to enable the appliance plug body to remain substantially within a cylindrical plane at least substantially equal to an outer diameter 180 of the rotational housing 178. According to this embodiment, an RCD appliance plug 154 can be installed in the electrical receptacle 177 when the electrical receptacle 177 is slid outward. The appliance cord 157 is then looped back at 158 toward the cord reel 176, inserted through the cord strain relief 147 and wrapped at least partially around the rotational housing 157. This can enable the much larger plug body 154 to rotate away from a position parallel to the face 179 of the rotational housing 178. If the RCD plug body 154 were installed either in the face 179 or the rear face 181 of the electrical outlet assembly 177, the appliance cord 157 may be unable to be wound or unwound from the rotational housing 178 when the cord reel 176 is installed in an electrical receptacle. This is due to a significant percentage of the plug body 154 that may extend outside of a cylindrical plane at least substantially equal to an outer diameter 180 of the rotational housing 178. In contrast, the appliance cord 157 in FIG. 11 may be wound and unwound from the cord reel 176 when installed in any electrical outlet that will fit the cord reel assembly 176.

Figure 12:
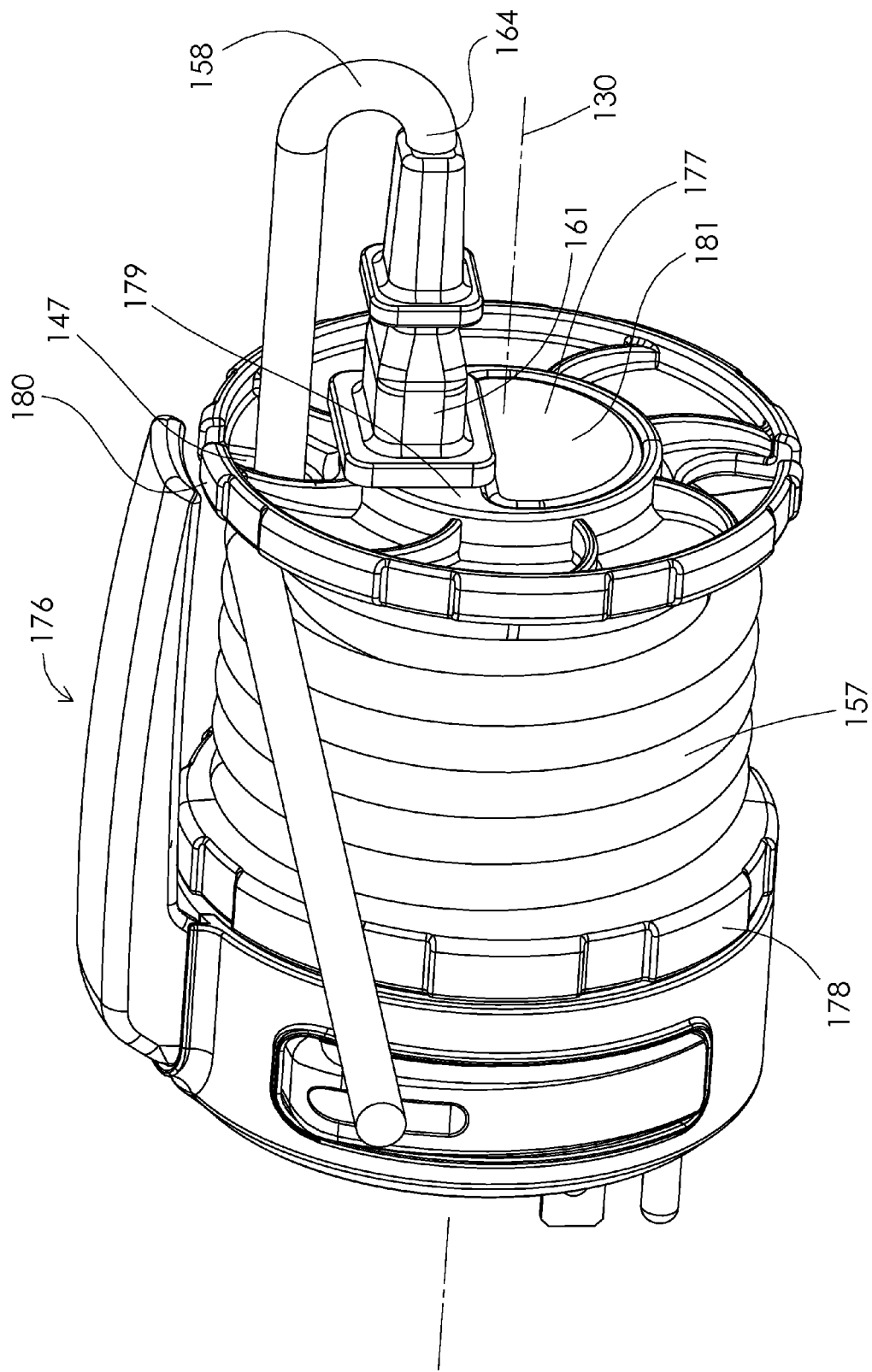
FIG. 12 is an isometric view of the cord reel shown in FIG. 11, with the reel outlet inserted to a first position with a standard appliance plug and cord on the reel.

Referring to FIG. 12, an isometric side view of a cord reel 176 is shown according to at least one embodiment with a sliding electrical receptacle 177 as discussed in FIG. 11. The electrical receptacle 177 is again disposed within the end of the rotational housing 178. However, in this example, the sliding electrical receptacle 177 is shown slid inward such that the outer face 181 of the sliding electrical receptacle 177 is flush with the face 179 of the rotational housing 178. A standard appliance plug 161 is installed in the an electrical receptacle positioned in the face 179 of the rotational housing 178. According to another embodiment, the electrical outlet could be disposed within the exposed face 181 of the sliding electrical receptacle 177. In either embodiment, the appliance cord 157 is then looped back at 158 toward the cord reel 176, inserted through the cord strain relief 147 and wrapped at least partially around the rotational housing 178. This can enable the standard plug body 161 to extend parallel to the axis of rotation 130 for the rotational housing 178. If the standard plug body 161 were left at an angle perpendicular to the face 179, the appliance cord 157 may be unable to be wound or unwound from the rotational housing 178 when the cord reel 176 is installed in an electrical outlet. This is due to a significant percentage of the plug body 161 and immediately adjacent appliance cord 164 that may extend outside of a cylindrical plane at least substantially equal to an outer diameter 180 of the rotational housing 178. In contrast, the appliance cord 157 shown in FIG. 12 may be wound and unwound from the cord reel 176 when installed in any electrical outlet that will fit the cord reel assembly 176.

Although the examples shown in FIGS. 1, 2A, 2B, 3A, 3B, 4, 5, 6, 7, 8, 9A, 9B, 10, 11, 12 depicts an electrical receptacle adapted to receive a standard 120VAC US prong assembly, a person of ordinary skill in the art will understand that the particular plug configuration may vary according to geographic location and/or plug types.

Figure 13:
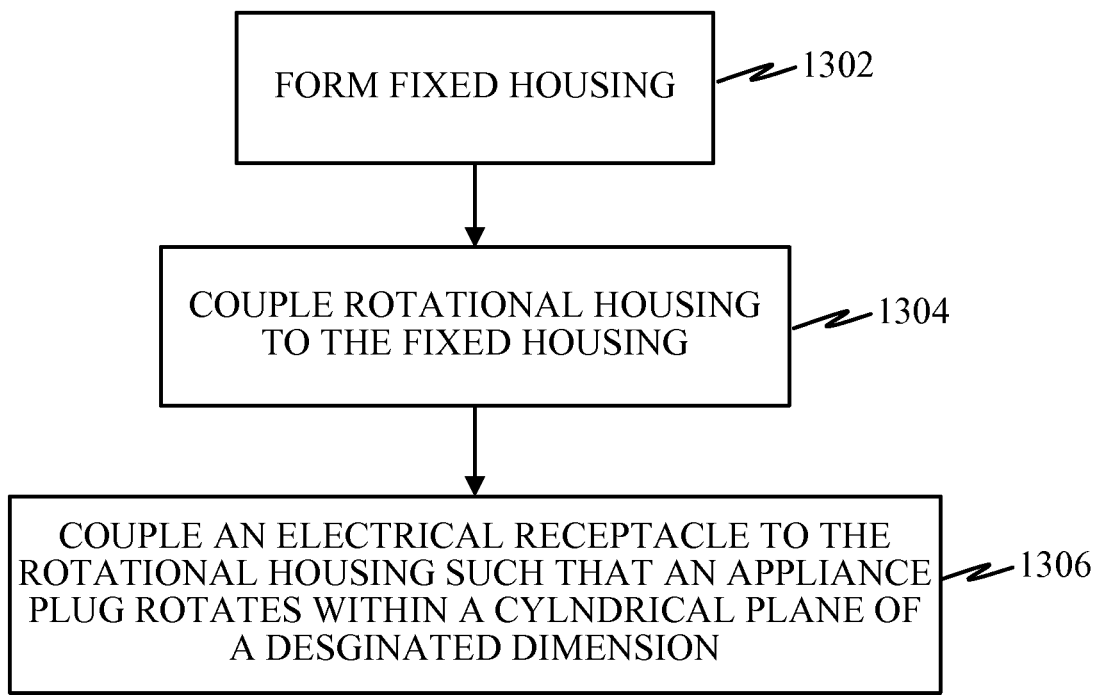
FIG. 13 is a flow diagram illustrating at least one example of a method of making a cord reel.

Additional aspects of the present disclosure relate to methods of making cord reels. FIG. 13 is a flow diagram illustrating a method of making a cord reel according to at least one implementation. At step 1302, a fixed housing may be formed. The fixed housing can be formed to include electrical prongs protruding from one end thereof. The fixed housing can be formed by molding, machining, casting or other suitable methods depending on the materials and/or design preferences. The fixed housing can be formed to include any or all of the features described herein above with reference to any of the preceding figures.

At step 1304, a rotational housing may be coupled to the fixed housing. The rotational housing can be adapted to hold an electrical cord, and may include any or all of the features described herein above with reference to any of the preceding figures. The rotational housing may be coupled to the fixed housing to facilitate rotation around an axis. In one example, as shown in FIG. 3A, the rotational housing may include annular ribs 132, 133 positioned adjacent to raised annular ribs 120, 121 on the fixed housing.

Referring again to FIG. 13, at step 1306, an electrical receptacle can be coupled to the rotational housing such that an appliance plug coupled to the electrical receptacle can rotate with the rotational housing at least substantially within a cylindrical plan of a designated dimension. For example, the electrical receptacle may be adapted to facilitate rotation of an appliance plug and immediately adjacent appliance cord within a cylindrical plane at least substantially equal to an outer diameter of the rotational housing. In another example, the electrical receptacle may be adapted to facilitate rotation of an appliance plug and immediately adjacent appliance code within a cylindrical plane with a diameter of about 3.5 inches or less.

In one example, the electrical receptacle may be pivotably coupled to the rotational housing. For instance, the electrical receptacle may be configured similar to the electrical receptacle 170 described with reference to FIGS. 3A, 9A, 9B, and 10.

In another example, the electrical receptacle may be slidably coupled to the rotational housing. For instance, the electrical receptacle may be configured similar to the electrical receptacle 177 described with reference to FIGS. 11 and 12.

In yet further examples, the electrical receptacle may be fixedly coupled to the rotational housing. For instance, the electrical receptacle may be configured similar to the electrical receptacle 155, 162, and/or 163 described with reference to FIGS. 6 and 7.

In still other examples, the electrical receptacle may be coupled to the rotational housing within a recess in the smaller diameter portion of the rotational housing. For instance, the electrical receptacle may be positioned within a recess similar to the recess 168 described with reference to FIG. 8.

One or more of the components, steps, features and/or functions illustrated in FIGS. 1, 2A, 2B, 3A, 3B, 4, 5, 6, 7, 8, 9A, 9B, 10, 11, 12, and/or 13 may be rearranged and/or combined into a single component, step, feature or function or embodied in several components, steps, or functions. Additional elements, components, steps, and/or functions may also be added without departing from the scope of the present disclosure. The apparatus, devices and/or components illustrated in FIGS. 1, 2, 3, 4, 5, 6, 7, 8, 9, 10, 11, and/or 12 may be formed by one or more of the steps described in FIG. 13.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

The various features associate with the examples described herein and shown in the accompanying drawings can be implemented in different examples and implementations without departing from the scope of the present disclosure. Therefore, although certain specific constructions and arrangements have been described and shown in the accompanying drawings, such configurations are merely illustrative and not restrictive of the scope of the disclosure, since various other additions and modifications to, and deletions from, the described configurations will be apparent to one of ordinary skill in the art. Thus, the scope of the disclosure is only determined by the literal language, and legal equivalents, of the allowed claims.

What is claimed is:

1. A cord reel comprising:
    a fixed housing comprising electrical prongs protruding from one end;
    a rotational housing connected to the fixed housing to facilitate rotation of the rotational housing relative to the fixed housing, the rotational housing adapted to hold an electrical cord; and
    at least one electrical receptacle mounted to the rotational housing to rotate with the rotational housing such that an appliance plug coupled to the electrical receptacle and an immediately adjacent appliance cord rotate within a cylindrical plane at least substantially equal to an outer diameter of the rotational housing.

2. The cord reel of claim 1, wherein the at least one electrical receptacle is pivotably mounted to the rotational housing.

3. The cord reel of claim 1, wherein the at least one electrical receptacle is slidably mounted to the rotational housing.

4. The cord reel of claim 1, wherein the at least one electrical receptacle is fixed within the rotational housing.

5. The cord reel of claim 1, wherein the outer diameter of the rotational housing is 3.5 in or less.

6. The cord reel of claim 1, wherein the rotational housing includes a minor diameter portion with a recess adapted to hold an appliance plug body at least substantially therein, and wherein the at least one electrical receptacle is disposed within the recess.

7. The cord reel of claim 1, further comprising a cord guide attached to the fixed housing and extending at least partially over the rotational housing.

8. A cord reel comprising:
    a fixed housing comprising electrical prongs protruding from one end;
    a rotational housing connected to the fixed housing and configured to rotate relative to the fixed housing, the rotational housing adapted to hold an electrical cord; and
    at least one electrical receptacle mounted to the rotational housing to rotate with the rotational housing such that an appliance plug coupled to the electrical receptacle together with an immediately adjacent appliance cord will rotate at least substantially within a cylindrical plane comprising a diameter of 3.5 inches or less.

9. The cord reel of claim 8, wherein the at least one electrical receptacle is pivotably mounted to the rotational housing.

10. The cord reel of claim 8, wherein the at least one electrical receptacle is slidably mounted to the rotational housing.

11. The cord reel of claim 8, wherein the at least one electrical receptacle is fixedly mounted to the rotational housing.

12. The cord reel of claim 8, wherein the at least one electrical receptacle is positioned within a recess in a smaller diameter portion of the rotational housing.

13. The cord reel of claim 8, wherein the cylindrical plane is at least substantially equal to an outer diameter of the rotational housing.

14. A method of making a cord reel, comprising:
    forming a fixed housing comprising electrical prongs protruding from one end thereof;
    coupling a rotational housing to the fixed housing, wherein the rotational housing is adapted to rotate relative to the fixed housing and to hold an electrical cord; and
    coupling an electrical receptacle to the rotational housing to rotate with the rotational housing, such that when either a standard plug or residual current device (RCD) plug is coupled to the electrical receptacle the standard plug or RCD plug, together with an immediately adjacent appliance cord, will rotate within a cylindrical plane comprising a diameter of 3.5 inches or less.

15. The method of claim 14, wherein coupling the electrical receptacle to the rotational housing comprises:
    pivotably coupling the electrical receptacle to the rotational housing.

16. The method of claim 14, wherein coupling the electrical receptacle to the rotational housing comprises:
    slidably coupling at least one electrical receptacle to the rotational housing.

17. The method of claim 14, wherein coupling the electrical receptacle to the rotational housing comprises:
    fixing at least one electrical receptacle to the rotational housing.

18. The method of claim 14, wherein coupling the electrical receptacle to the rotational housing comprises:
    positioning the at least one electrical receptacle within a recess in a smaller diameter portion of the rotational housing.

19. The method of claim 14, wherein the cylindrical plane is at least substantially equal to an outer diameter of the rotational housing.

* * * * *